United States Patent [19]

Tucker

[11] 3,831,881
[45] Aug. 27, 1974

[54] DISENGAGEABLE ANTI-BACKUP DEVICE FOR FILM CARTRIDGE
[75] Inventor: Archie J. Tucker, Rochester, N.Y.
[73] Assignee: Eastman Kodak Company, Rochester, N.Y.
[22] Filed: Jan. 12, 1973
[21] Appl. No.: 323,019

Related U.S. Application Data
[63] Continuation-in-part of Ser. No. 229,924, Feb. 28, 1972, abandoned.

[52] U.S. Cl. ............... 242/194, 242/71.1, 242/197
[51] Int. Cl.... G03b 1/04, G11b 15/32, G11b 23/04
[58] Field of Search............ 242/71.1, 194, 197–200

[56] References Cited
UNITED STATES PATENTS

| 2,732,754 | 1/1956 | Foster | 242/197 X |
| 3,599,894 | 8/1971 | Edwards | 242/194 |
| 3,622,101 | 11/1971 | Sutliff et al. | 242/194 |
| 3,623,679 | 11/1971 | Neudecker et al. | 242/194 |

Primary Examiner—Leonard D. Christian
Attorney, Agent, or Firm—G. Herman Childress

[57] ABSTRACT

An anti-backup device located within a film cartridge insertable into a camera permits the rotation of a film take-up core in a forward direction while securing the core against rotation in a reverse direction so as to prevent "clockspringing" of film when the cartridge is not within a motion picture camera. The anti-backup device comprises a fork-like member located within a hollow core on a rotatable film take-up core. The control member has flexible outwardly extending arms projecting from a body portion. In an engaged position of the control member, the arms thereof slide over internal cam or ratchet surfaces of the take-up core during rotation of the core in the forward (take-up) direction and hence permits such rotation. On the other hand, these arms engage the cam or ratchet surfaces of the core post to block rotation of the core when an attempt is made to rotate the core in the reverse (unwinding) direction. When the film cartridge is placed within a camera, the member can be moved axially until it is out of engagement with the cam or ratchet surfaces, thereby permitting free rotation of the core in both the forward and reverse direction. This eliminates the "clicking" noise associated with operation of the anti-backup device and also permits filming of fade-and-lap dissolve sequences in cameras having mechanisms for filming such sequences.

8 Claims, 6 Drawing Figures

PATENTED AUG 27 1974 3,831,881

DISENGAGEABLE ANTI-BACKUP DEVICE FOR FILM CARTRIDGE

This application is a continuation-in-part of my commonly assigned, copending U.S. Pat. application Ser. No. 229,924, filed Feb. 28, 1972 and now abandoned.

BACKGROUND OF THE INVENTION

1. Field of the Invention

This invention relates to film cartridges and, more specifically, to an anti-backup device within a film cartridge for preventing "clockspringing" of film in the cartridge due to reverse rotation of a film take-up core when the cartridge is not within a camera, the device being disengageable when loaded in a camera either automatically or by a camera operator.

2. Description of the Prior Art

In certain types of film cartridges, such as those of the type described in U.S. Pat. Nos. 3,208,686 and 3,208,685 (commonly known as "super 8" cartridges), film wound around the take-up core can "clockspring." Clockspringing refers to a partial loosening of successive coils of a film roll that results in a loose roll of film. Clockspringing of the film in the cartridge can be avoided by securing the take-up core against rotation when the cartridge is out of the camera. This is desirable since it is known that such clockspringing can adversely affect operation of the cartridge in the camera. To prevent the occurrence of clockspringing, an anti-backup device usually is employed. However, because of the "clicking" noise made by the device during operation, it is desirable that the device be disengaged when the cartridge is within the camera. This is especially important when filming is accompanied by recording of sound because this noise may be picked up by the sound apparatus of the camera. Also, disengagement of the anti-backup device permits a "fade, lap and dissolve" type of filming operation in specialized cameras. For a detail understanding of the aforementioned fade, lap and dissolve features reference is made to commonly assigned, U.S. Pat. No. 3,584,806, issued June 15, 1971 in the name of E. A. Edwards et al., entitled "Anti-Backup Mechanism For the Takeup Spool in a Film Cartridge."

Various mechanisms have been employed as anti-backup devices in film cartridges, such as that described in commonly assigned U.S. Pat. No. 3,622,101, issued on Nov. 23, 1971 in the name of Robert C. Sutliff et al. and entitled "Integral Anti-Backup Mechanism in a Motion Picture Film Cartridge," in which a "finger" is formed integral with the wall of a super 8 cartridge separating the film supply and take-up chambers. Release of the anti-backup device also is desirable to facilitate the withdrawing of film from the cartridge in the reverse direction for processing of the film. In this regard, reference is made to commonly assigned U.S. Pat. No. 3,550,877 which discloses a punch adapted to penetrate the side walls of the cartridge to disengage the anti-backup device shown in U.S. Pat. 3,622,101 and permit withdrawal of film through the exposure aperture during processing. Because this punch penetrates the cartridge and destroys its light-tight condition, it is not suitable for disengaging the anti-backup device when the cartridge is being used in a camera.

SUMMARY OF THE INVENTION

Accordingly, it is an object of this invention to provide a film cartridge with a disengageable anti-backup device which can be economically manufactured and also can be used in a "super 8" film cartridge.

Another object of the subject invention is to provide an anti-backup device which can be readily disengaged either manually or automatically when the cartridge is placed within a camera, and to such an anti-backup device which also can be readily disengaged to facilitate the easy removal of the film from the cartridge for processing of the film.

A further object of the subject invention is to provide an anti-backup device which (1) normally secures the take-up core against reverse turning of the core (and hence "clockspringing" of the film within the cartridge) and (2) can be disengaged and re-engaged without affecting the light-tight condition of the cartridge.

In accordance with a preferred embodiment of the present invention, a film cartridge is equipped with a substantially free-turning core rotatable about a hollow core post, in which is located part of an anti-backup device. The anti-backup device, when engaged, secures the takeup core against rotation in a reverse direction while permitting the rotation of the core in a forward direction. The take-up core includes at least one cam or ratchet surface along an inner surface of the core that cooperates with a fork-like control member. The member has a body portion positioned within the core post, and outward extending arms projecting from the body portion which can cooperate with the ratchet surface to secure the core against rotation in a reverse direction while permitting its rotation in a forward direction. The arms are disengageable from the ratchet surface when it is desired to rotate the core in the reverse direction or to avoid the noise resulting from rotation of the core when the arms are engageable with the ratchet surface.

BRIEF DESCRIPTION OF THE DRAWINGS

In a detailed description of the preferred embodiment of the invention presented below, reference is made to the accompanying drawings, in which.

DESCRIPTION OF THE PREFERRED EMBODIMENT

Because photographic device of the type under discussion are well known, the present description will be directed in particular to elements forming part of, or cooperating more directly with, the present invention, elements not specifically shown or described herein being understood to be selectable from those known in the art.

Figure 6:
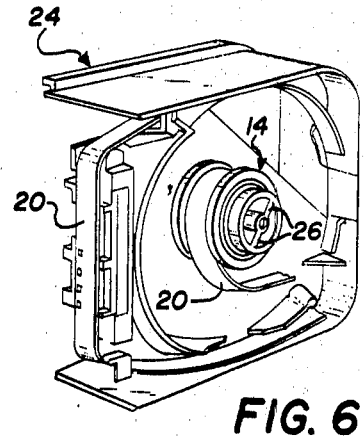
FIG. 6 is a perspective view of the inside of part of a loaded film cartridge as viewed from the film take-up side (the cartridge cover being omitted), and showing the position of the film take-up core within the film cartridge.

As shown in FIG. 6, a film take-up core 14 (on which film 20 is wound after it is exposed) is positioned in a "super 8" film cartridge generally designated 24. The film cartridge 24 may be, for example, generally similar to those disclosed in the before-mentioned U.S. Pat. Nos. 3,208,685 and 3,208,686. In order to avoid unnecessary lengthening of this specification and complication of the drawings, and since a description of the cartridge may be found in the above-cited patents, the following description will be directed primarily to the anti-backup device of the present invention. The illustrated preferred embodiment of the invention includes a fork-like control member 10 located within a core post 12 and aligned therein in a manner explained more fully hereinafter. A series of three circumferentially spaced ratchet surfaces 14a, 14b, and 14c (FIG. 2) are defined by the inner surface of the hollow take-up core 14. These three surfaces extend generally radially so that they are engageable with portions of control member 10 as the core 14 rotates in a reverse direction. Surfaces 14a–c are separated by arcuate ramp surfaces 14d–f.

Figure 1:
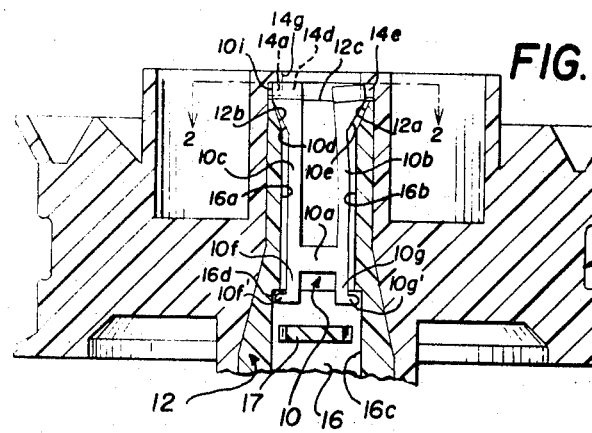
FIG. 1 is a fragmentary cross-sectional view of a super 8 type film cartridge incorporating a preferred embodiment of an anti-backup device of the invention showing the position of a fork-like control member of the anti-backup device positioned within the core post, and showing one of its locations relative to a ratchet surface.
Figure 2:
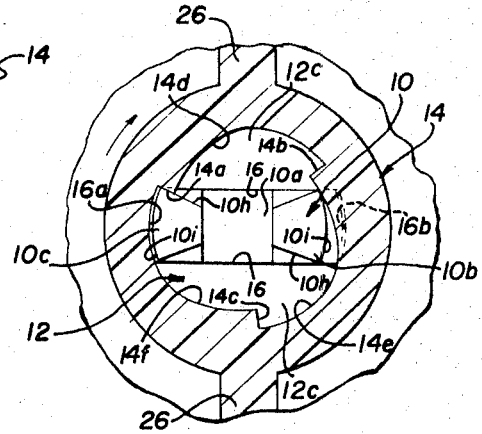
FIG. 2 is a section view taken along line 2—2 of FIG. 1.
Figure 3:
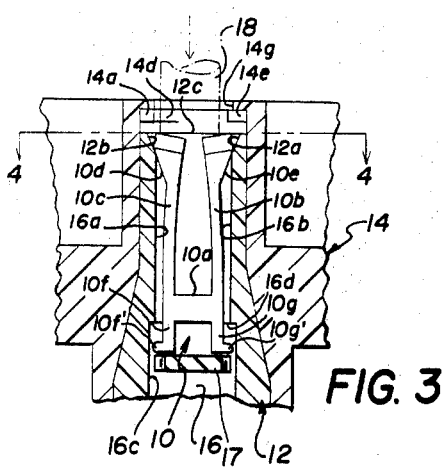
FIG. 3 is a fragmentary cross-sectional view similar to FIG. 1 but showing the control member in a second or depressed position within the core post.
Figure 4:
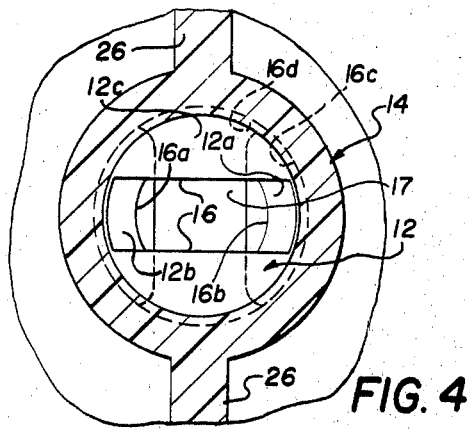
FIG. 4 is a section taken along line 4—4 in FIG. 3 and with member 10 omitted to more clearly illustrate certain structures.
Figure 5:
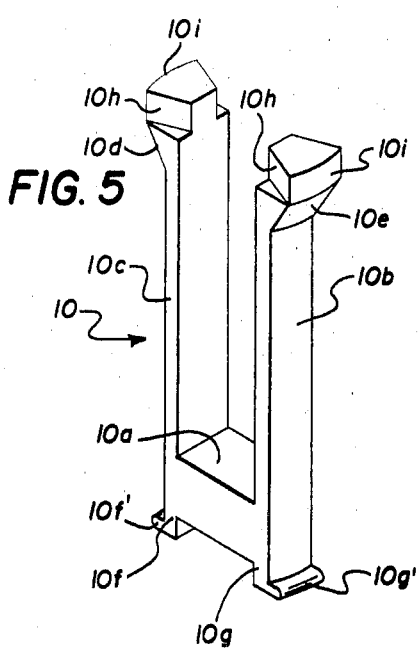
FIG. 5 is an enlarged isometric view of the control member.

The fork-like control member 10 is shown in detail in FIG. 5 and, as illustrated, comprises a generally rectangular body portion 10a and a pair of flexible, substantially parallel elongated arms 10b and 10c that are integral with and extend from one end of the body portion 10a in spaced relation to each other. The free end portions of the arms (i.e., the end portions opposite from body portion 10a) are somewhat enlarged to form head portions having beveled surfaces 10d and 10e, that are adapted to cooperate with portions of the post 12 as explained later. Guide portions 10f and 10g of the control member are integrally formed with the body portion 10a and comprise short, finger-like members that project from the end of the body portion in a direction opposite from the arms. The guide portions 10f and 10g include outwardly projecting, part-cylindrical flange portions 10f' and 10g' that extend beyond opposite side edge of the body portion 10a. These cylindrical portions are adapted to engage and slide along surfaces 16a and 16b of a generally rectangular slot 16 in the core post 12 during insertion of the control member into the post so that that guide portion tends to guide movement of the control member through the slot during such insertion. The guide portions 10f and 10g are flexible, and when in their normal (unflexed) state their outermost cylindrical portions are spaced apart by a distance slightly greater than the width of the slot 16. As a result, the guide portions are flexed inwardly as they travel through slot 16. As shown in FIGS. 1, 3 and 4, the slot 16 extends from the upper end of the post 12 to an enlarged, generally cylindrical cavity designated 16c, thereby forming a ledge or shoulder 16d. When the control member is fully inserted into th positions shown in FIGS. 1–3 the cylindrical flange portions 10f' and 10g' snap outwardly into the cavity 16c. If the control member is then moved upward (as viewed in FIGS. 1–3) in a direction from the shoulder toward the open end of the post, the portions 10f' and 10g' engage shoulder 16d and serve to secure control member from inadvertent withdrawal through the slot. The post 12 preferably includes a stop member 17 (FIGS. 1, 3 and 4) which extends across the cavity 16c in a direction transverse to the width of slot 16. The stop member is spaced from shoulder 16d by a distance which permits the normal range of movement of the control member from its FIG. 1 position to its FIG. 2 position. However, the stop member does limit movement of the control member downwardly beyond its FIG. 3 position and thereby prevents the control member from being accidentally pushed too far through the slot. Thus member 17 and shoulder 16d each comprise stop means for limiting movement of the control member in one direction. The body portion 10 is shaped and dimensioned with respect to the slot 16 so that the body portion can be moved up and down in the slot along the axis of post 12, but cannot rotate with respect to slot 16. This cooperation also prevents rotation of member 10 with the take-up core 14 during winding of film onto the core.

The free end portions of arms 10b and 10c have surfaces 10h that cooperate with ratchet surfaces 14a, 14b and 14c when the anti-backup device is engaged. The head portions of the arms also have generally cylindrical edge surfaces 10i adapted to slide along the ramp portions 14d–f of the ratchet surfaces on take-up core 14. Surfaces 10d and 10e, alone or together with surfaces 10i, serve to space the arms 10c, 10b, respectively, from slot surfaces 16a and 16b so that the arms can flex in operation as described later. As the member 10 is inserted into slot 16 in post 12 through the open, upper end of the slot (as viewed in FIGS. 1 and 3), the arms are cammed inwardly toward each other slightly as beveled surfaces 10d, 10e engage and then pass through the edge of the opening in port 12. Because of this deflection of the arms and the flexible nature of the arms, the free end portions of the arms are urged outwardly (away from each other).

As shown in FIGS. 1 and 3, the upper end of post 12 terminates short of the upper end of the hollow portion of take-up core 14. As illustrated, this results from the cooperating shapes of the exterior surface of post 12 and core 14 and the relative dimensions of these parts. The ratchet surfaces 14a–f are in the area of the take-up core located between the upper edge of the core and the upper edge of post 12 so that the ratchet surfaces are engageable by the surfaces 10h and 10i when member 10 is located as shown in FIGS. 1 and 2. The upper end portion of the post 12 is tapered as shown at 12a and 12b in FIG. 1, 3 and 4 to facilitate inward flexing of arms 10b and 10c as member 10 is moved from its FIG. 1 position to its FIG. 3 position.

Engaged and disengaged positions of the control member 10 relative to the ratchet surfaces of the take-up core 14 are shown in FIGS. 1–3. In the engaged position, shown in FIGS. 1 and 2, the arms 10b and 10c are positioned so that the surfaces 10h on the free end portions thereof are engageable with any one of the ratchet surfaces 14a, 14b and 14c to secure the take-up core 14 against any significant rotation in a reverse direction (a counterclockwise direction as viewed in FIG. 2). In the position illustrated in FIGS. 1 and 2, ratchet surface 14a is engaged by surface 10h of arm 10c. Once one of the ratchet surfaces 14a–c is engaged with a surface 10h, the take-up core 14 is secured against rotation in the reverse direction. When the take-up core 14 is rotated in a forward or clockwise direction (shown by the arrow in FIG. 2), the cam surfaces 14a, 14b and 14c are not engaged by arms 10b and 10c, and the surfaces 10i of arms 10b and 10c merely slide substantially unimpeded along the arcuate ramp surfaces 14d–f as the core 14 rotates. Hence, the take-up core 14 can rotate freely in the forward direction but is secured against substantial rotation in the reverse direction. As is well known in the art, the core 14 can be rotated in a camera, etc. by means of a drive (not shown) that can be coupled to lugs 26 (FIG. 6) on core 14.

As the take-up core 14 rotates in the forward direction, the relative movement between the ratchet surfaces 14a–f and the arms 10b and 10c gives rise to a "clicking" sound, caused by the arms 10b and 10c snapping outwardly as they pass from the end of one arcuate ramp surface to the next ramp surface. In accordance with an important feature of the invention, the control member 10 can be disengaged if desired as, for example, during filming when sound is simultaneously being recorded and it is possible for the "clicking" sound to be recorded, for removal of film from the cartridge for processing, for fade-and-lap dissolve filming sequences, etc.

As shown in FIG. 3, this may be accomplished by means of a disengaging bar or pin 18, which can be part of a camera, processing apparatus etc. The bar is activated (moved downwardly) either manually by an operator or automatically when the cartridge 24 is within the camera or other apparatus. The disengaging bar 18 is positioned and dimensioned so that it can pass through an opening 14g in core 14 and come into contact with and push against the arms 10b and 10c of the control member 10. The disengaging bar 18, when thus activated, presses against arms 10b and 10c forcing the control member 10 downward within slot 16 into its disengaged position shown in FIG. 3 wherein it is fully retracted into the slot 16. As the control member 10 moves downwardly, beveled core portions 12a, 12b are engaged by the beveled surfaces 10d, 10e of the control member to flex the arms 10b and 10c inwardly. The bar must exert sufficient force to overcome the upward component of force resulting from the inward deflection of the flexible arms of the control member by core portions 12a and 12b. When the pressure exerted by bar 18 is removed, this upward force causes the control member 10 to "spring" back into its normal engaged position shown in FIG. 1. In the disengaged (FIG. 3) position, the disengaging bar 18 removes the control member from contact with the ratchet surfaces of core 14, thereby allowing free rotation of the core 14 both in the forward and reverse direction, and eliminating any "clicking" noise associated with the anti-backup device. Penetration of the bar into the cartridge is limited by the upper end 12c of the post 12.

The invention has been described in detail with particular reference to a preferred embodiment thereof, but it will be understood that variations and modifications can be effected within the spirit and scope of the invention.

I claim:

1. In a cartridge for film or other strip material having a film take-up core rotatable about an axis, an anti-backup device for securing said take-up core against rotation in a reverse or unwinding direction while permitting said core to rotate in a forward or take-up direction, the improvement wherein said anti-backup device comprises: means defining a ratchet on an inner surface of said take-up core; a fork-like control member mounted on the cartridge for movement relative to said core between a first position and a second position, said member having spaced flexible arms engageable with said ratchet when the member is in one of its positions thereby to secure said core against rotation in its unwinding direction, and said arms of said control member being disengaged from said ratchet when said member is in its second position to permit rotation of said core in either direction.

2. In a cartridge as set forth in claim 1 wherein the cartridge further comprises a post supporting said core for rotation, means defining an opening in said post, a portion of said control member being positioned in said opening and being movable with respect to said post, and a portion of each of said arms projecting from said opening when said member is in its first position.

3. A film cartridge comprising a post with an elongate slot therein opening at one end of the post, a film take-up core mounted for rotation about said post in each of two directions, a portion of the core projecting beyond said one end of the post, means on said projecting portion defining a ratchet surface, an anti-backup control member mounted for movement within said slot between a first position and a second position, said control member having a body portion with outwardly extending integral arms projecting from said body portion and guide portions for guiding movement of the control member relative to said slot, said arms being engageable with said ratchet surface when the control member is in its first position to permit rotation of the core in one direction only, said arms being disengaged from said ratchet surface when said control member is in its second position, thereby permitting rotation of the core in either direction.

4. A film cartridge as set forth in claim 3 wherein said arms are fully retracted into said slot when said member is in its second position, the end of the slot at its opening into the post having beveled surfaces, and said arms having beveled portions which cooperate with said beveled surfaces of said slot to effect inward flexing of said arms when said control member is moved from its first position to its second position.

5. A film cartridge, as set forth in claim 3 wherein said portion of said core is generally cylindrical, and said ratchet surface comprises a plurality of arcuate ramp surfaces around the circumference of said portion and a plurality of generally radially extending surfaces engageable with said arms.

6. A film cartridge as set forth in claim 3 further comprising stop means positioned in said post relative to said control member for limiting movement of said control member relative to said post.

7. A film cartridge as set forth in claim 6 wherein said stop means comprises a shoulder in said post at the end of the slot opposite from said one end of said post, and said control member has means engageable with said shoulder for limiting movement of said control member in a direction from said shoulder toward said one end of said post.

8. A film cartridge as set forth in claim 6 wherein said stop means comprises a stop member positioned in said core along the path of movement of said control member to limit movement of the control member into the core.

* * * * *